US012700545B2

(12) United States Patent
Suzuki et al.

(10) Patent No.: US 12,700,545 B2
(45) Date of Patent: Aug. 4, 2026

(54) MULTILAYER ELECTRONIC COMPONENT

(71) Applicant: KYOCERA Corporation, Kyoto (JP)

(72) Inventors: Tatsuya Suzuki, Kirishima (JP);
Hirotoshi Kii, Kirishima (JP); **Atsushi
Miyabayashi, Aira (JP); Kenta
Nakashima, Kirishima (JP); Satoru
Naokawa**, Yasu (JP)

(73) Assignee: KYOCERA Corporation, Kyoto (JP)

( * ) Notice: Subject to any disclaimer, the term of this
patent is extended or adjusted under 35
U.S.C. 154(b) by 0 days.

(21) Appl. No.: 19/206,371

(22) Filed: May 13, 2025

(65) Prior Publication Data

US 2025/0273402 A1      Aug. 28, 2025

Related U.S. Application Data

(63) Continuation-in-part of application No.
PCT/JP2024/039019, filed on Nov. 1, 2024.

(30) Foreign Application Priority Data

Nov. 30, 2023      (JP) .................................. 2023-203316

(51) Int. Cl.
*H01G 4/30*          (2006.01)
*H01G 4/224*        (2006.01)
(52) U.S. Cl.
CPC ............... *H01G 4/30* (2013.01); *H01G 4/224*
(2013.01)
(58) Field of Classification Search
CPC .......... H01G 4/30; H01G 4/005; H01G 4/008;
H01G 4/224; H01G 4/228; H01G 4/232;
H01G 4/248

USPC ............. 361/301.4, 321.1, 303, 306.3, 321.3
See application file for complete search history.

(56) References Cited

U.S. PATENT DOCUMENTS

| | | | |
|---|---|---|---|
| 2005/0214517 A1 | 9/2005 | Sugimoto et al. | |
| 2009/0161293 A1* | 6/2009 | Takeuchi ............... | H01G 4/005 |
| | | | 361/321.2 |
| 2014/0285946 A1* | 9/2014 | Yoon ..................... | H01G 4/0085 |
| | | | 29/25.03 |
| 2014/0293503 A1 | 10/2014 | Sasabayashi et al. | |
| 2014/0301014 A1* | 10/2014 | Kim ......................... | H01G 4/30 |
| | | | 156/89.12 |
| 2018/0108482 A1* | 4/2018 | Kogure ................... | H01G 4/224 |
| 2018/0182551 A1* | 6/2018 | Ahn ......................... | H01G 4/12 |
| 2018/0294097 A1* | 10/2018 | Ono ......................... | H01G 4/12 |
| 2025/0037935 A1 | 1/2025 | Fujikawa | |

FOREIGN PATENT DOCUMENTS

| | | | | |
|---|---|---|---|---|
| JP | 2002217055 A | * | 8/2002 | |
| JP | 2005-285801 A | | 10/2005 | |
| JP | 2006237078 A | * | 9/2006 | |

(Continued)

*Primary Examiner* — Arun Ramaswamy
(74) *Attorney, Agent, or Firm* — Volpe Koenig

(57) ABSTRACT

A multilayer electronic component includes an effective
portion and a cover. The effective portion includes a dielec-
tric layer and an inner electrode that are stacked alternately
in a stacking direction. The cover overlaps the effective
portion in the stacking direction. The cover includes mul-
tiple insulating layers and a dummy electrode. The multiple
insulating layers are stacked in the stacking direction. The
dummy electrode is positioned between the multiple insu-
lating layers. The dummy electrode includes at least one
oxidation region.

12 Claims, 5 Drawing Sheets

(56)         References Cited

FOREIGN PATENT DOCUMENTS

| JP | 2014-212298 | A | 11/2014 |
| JP | 2018-147927 | A | 9/2018 |
| WO | 2023/120173 | A1 | 6/2023 |

* cited by examiner

201

5

5

203

D3

D2          D1

MULTILAYER ELECTRONIC COMPONENT

REFERENCE TO RELATED APPLICATIONS

This application is a Bypass Continuation-In-Part Application which claims priority under 35 U.S.C. § 119 of International Application No. PCT/JP2024/039019, filed on Nov. 1, 2024, in the WIPO, and Japanese Patent Application No. 2023-203316, filed on Nov. 30, 2023, in the Japanese Patent Office, the entire contents of which are hereby incorporated by reference.

BACKGROUND OF THE INVENTION

1. Field of the Invention

The present disclosure relates to a multilayer electronic component such as a multilayer ceramic capacitor.

2. Description of the Related Art

Examples of a known multilayer electronic component include a multilayer ceramic capacitor (for example, Japanese Unexamined Patent Application Publication No. 2014-212298). Such a multilayer ceramic capacitor includes, for example, an effective portion, a cover, and an outer electrode. The effective portion includes a dielectric layer and a plate-shaped inner electrode that are stacked alternately, and the effective portion is directly responsible for the function of the capacitor. The cover, while covering the effective portion in a stacking direction of the dielectric layer and the inner electrode, contributes to protection and the like of the effective portion. The outer electrode is composed of a metal layer. A main body is composed of the effective portion and the cover, and the metal layer covers a side surface and/or the like of the main body. The outer electrode contributes to mounting of the capacitor onto a circuit board or the like. A dummy electrode (auxiliary electrode) is provided for the cover in Japanese Unexamined Patent Application Publication No. 2014-212298. The dummy electrode contributes to, for example, deposition of a metal that is formed into the outer electrode by a plating method.

SUMMARY OF THE INVENTION

In an aspect of the present disclosure, a multilayer electronic component includes an effective portion and a cover. The effective portion includes a dielectric layer and an inner electrode that are stacked alternately in a stacking direction. The cover overlaps the effective portion in the stacking direction. The cover includes multiple insulating layers and a dummy electrode. The multiple insulating layers are stacked in the stacking direction. The dummy electrode is positioned between the multiple insulating layers. The dummy electrode includes at least one oxidation region.

DESCRIPTION OF THE PREFERRED EMBODIMENTS

Figure 1:
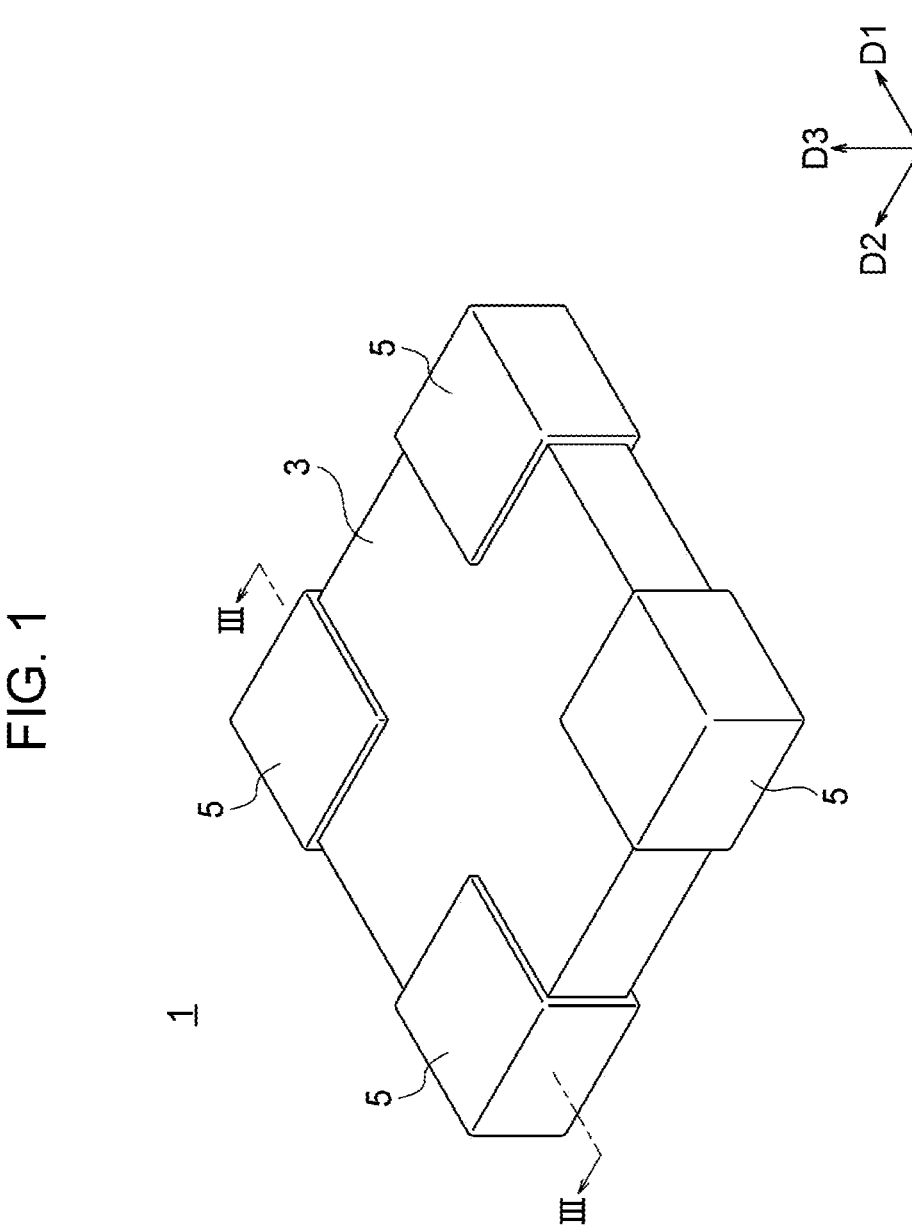
FIG. 1 is a perspective view of a capacitor according to a first embodiment.

Hereinafter, an embodiment according to the present disclosure will be described with reference to the drawings. Note that the drawings used in the following description are schematic. Accordingly, for example, dimensional ratios and the like on the drawings do not necessarily agree with the actual dimensional ratios and the like. Dimensional ratios and the like may also disagree between the drawings. A specific shape, a specific dimension, and/or the like may be illustrated in an exaggerated manner, and/or details may be omitted. However, the above statement does not deny that the actual shape and/or dimensions may be as illustrated in the drawings or that features of the shape and/or dimensions may be extracted from the drawings.

Regarding aspects to be described relatively later, basically, only differences from the aspect to be described relatively earlier will be described. Particulars not specifically mentioned may be the same as and/or similar to those of the aspect to be described earlier or may be inferred from the aspect to be described earlier. Between different aspects, mutually corresponding constituent elements may be denoted by the same reference sign for convenience, even when a difference exists between the constituent elements.

When the following description refers to a "quadrangle" (or quadrangular shape), a "square" (or square shape), and a "rectangle" (or rectangular shape), a corner portion of the above shapes may be chamfered with a curved surface or the like within a range where the concepts of the above shapes are established. For example, a corner portion between two sides may be chamfered by a length of not more than one-fifth, not more than one-tenth, or not more than one-twentieth of the length of a shorter side of the two sides. Note that, when viewed microscopically, as a matter of course, a corner portion may be rounded due to an accuracy (error) in manufacture. The same or similar principle applies to other polygons and the like.

Outline of Embodiment

FIG. 1 is a perspective view of a capacitor 1 according to a first embodiment (one example of a multilayer electronic component). FIG. 1 and the other figures referred to later include a rectangular coordinate system D1D2D3 for convenience. The capacitor 1 may be used with any portion being an upper portion or a lower portion. However, the terms such as "upper surface" and "lower surface" may be used in the description of an embodiment with the +D3 side being the upper side for convenience.

The capacitor 1 is, for example, a multilayer ceramic capacitor. The capacitor 1 includes a main body 3 in an approximately rectangular parallelepiped shape and four outer electrodes 5. The four outer electrodes 5 are positioned on respective four corners of the main body 3 in plan view (when viewed in a D3 direction). Each of the four outer electrodes 5 contributes to electrical connection of the capacitor 1 to another electronic component (for example, a circuit board that is not illustrated).

Figure 3:
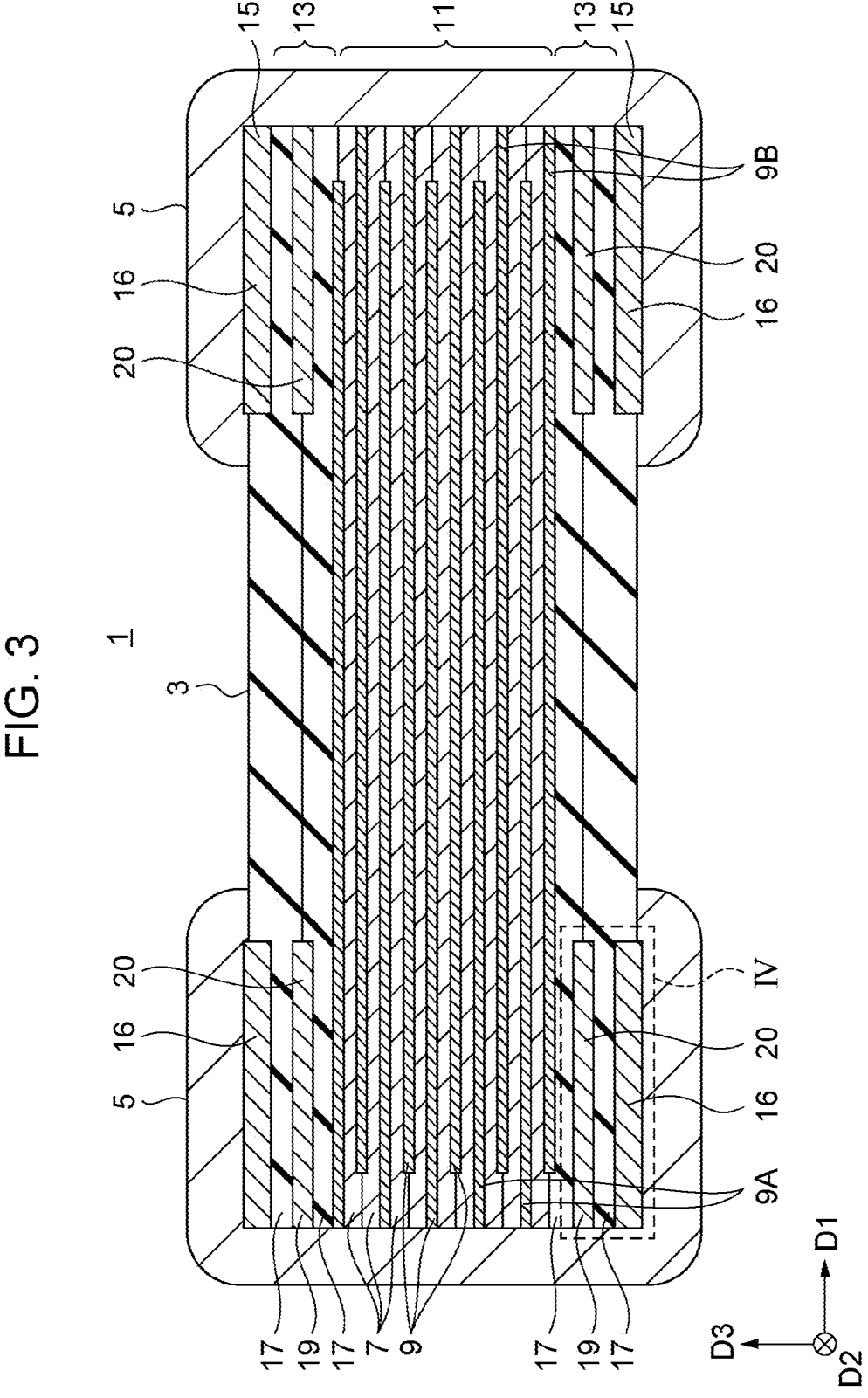
FIG. 3 is a sectional view taken along line III-III in FIG. 1.

FIG. 3 is a sectional view taken along line III-III in FIG. 1. Note that FIG. 3 illustrates a D1D3 section cutting the outer electrodes 5 positioned on the +D2 side. However, a D1D3 section cutting the outer electrodes 5 positioned on the −D2 side, a D2D3 section cutting the outer electrodes 5 positioned on the −D1 side, and a D2D3 section cutting the outer electrodes 5 positioned on the +D1 side are basically the same as and/or similar to the D1D3 section in FIG. 3. In the description of an embodiment, for convenience, a positional relationship and the like between constituent elements may be described by using the terms "D1", "D2", and "D3" based on the section illustrated in FIG. 3 without any specific note.

The main body 3 includes, for example, an effective portion 11, two covers 13, and an underlying layer 15. The two covers 13 overlap respective upper surface and lower surface of the effective portion 11, and the underlying layer 15 overlaps a surface, of the corresponding cover 13, opposite from the effective portion 11. The effective portion 11 includes multiple dielectric layers 7 and multiple inner electrodes 9, the multiple dielectric layers 7 and the multiple inner electrodes 9 overlapping alternately. The multiple inner electrodes 9 includes multiple first inner electrodes 9A and multiple second inner electrodes 9B. Each underlying layer 15 includes, for example, four underlying electrodes 16 at positions corresponding to the positions of the four outer electrodes 5.

The effective portion 11 is directly responsible for the function of the capacitor. Each of the two covers 13 contributes to, for example, protection and improvement in strength of the main body 3. Each of the four underlying electrodes 16 contributes to, for example, deposition of a metal to be formed into the outer electrode 5 by a plating method and/or improvement in the adhesion force of the outer electrode 5 to the main body 3.

Each of the covers 13 includes, for example, multiple insulating layers 17 (two in the example of FIG. 3) and at least one dummy layer 19 (one in the example of FIG. 3) that is positioned between the multiple insulating layers 17. Each dummy layer 19 includes, for example, four dummy electrodes 20 at positions corresponding to the positions of the four outer electrodes 5. Each of the four dummy electrodes 20 contributes to, for example, reinforcement of the cover 13 and/or improvement in the connection strength between the main body 3 and the outer electrode 5, and the dummy electrode 20 functions as a foundation of the outer electrode 5 in an aspect where the outer electrode 5 is formed by a plating method.

Figure 4:
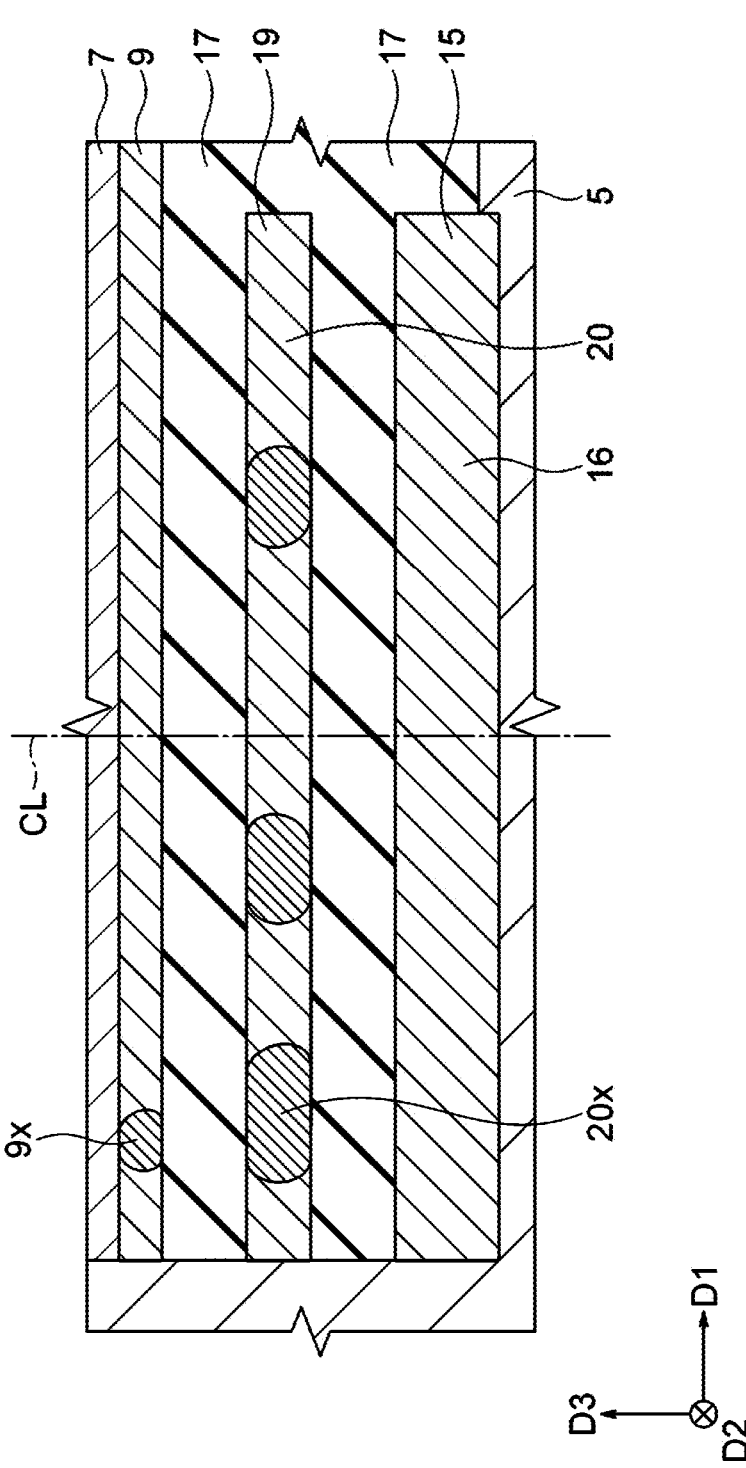
FIG. 4 is an enlarged view of region IV of FIG. 3.

FIG. 4 is an enlarged view of region IV of FIG. 3. The dummy electrode 20 includes at least one oxidation region 20x (three in FIG. 4).

Such formation of the at least one oxidation region 20x increases, for example, the volume of the dummy electrode 20. As a result, for example, the adhesion between the dummy electrode 20 and the insulating layer 17 is improved. In other words, a gap is less likely to form between the dummy electrode 20 and the insulating layer 17. The above-described improvement in the adhesion increases, for example, the strength of the cover 13. For example, a gas and/or a liquid that has entered a gap for some reason is less likely to affect mechanical characteristics and/or electrical characteristics. In an aspect where the outer electrode 5 is formed by a plating method, a plating solution is less likely to affect mechanical characteristics and/or electrical characteristics by entering a gap.

The above is the outline of an embodiment. Specifically, an embodiment will be described approximately in the following order.

1. Configuration of Capacitor According to First Embodiment (FIGS. 1 to 3)
  1.1. Overall Configuration
  1.2. Effective Portion 1.3. Cover
  1.4. Underlying Electrode
  1.5. Outer Electrode
2. Oxidation Region
  2.1. Oxidation Region of Dummy Electrode
  2.2. Comparison with Oxidation Region of the Other Electrodes
3. Manufacturing Method of Capacitor
4. Configuration of Capacitor According to Another Embodiment (FIG. 6)
5. Summary of Embodiments

1. Configuration of Capacitor According to First Embodiment

1.1. Overall Configuration

The capacitor 1 illustrated in FIG. 1 is, for example, a chip type component that is to be surface-mounted. Specifically, for example, the capacitor 1 is disposed with a surface on the −D3 side or on the +D3 side facing a circuit board that is not illustrated. The capacitor 1 is mounted on the circuit board by bonding four pads of the circuit board to the respective four outer electrodes 5 by a conductive bonding material (such as solder) that is not illustrated.

The configuration (an inside structure and an outside shape) of the capacitor 1 is, for example, approximately symmetric about a symmetry plane (not illustrated). The symmetry plane is parallel to a D1D2 plane and extends through the center, in a thickness direction, of the capacitor 1 (the D3 direction). The configuration of the capacitor 1 is, for example, 180-degree rotationally symmetric when viewed in the D3 direction. Of course, the capacitor 1 does not necessarily have such symmetry.

The main body 3 has, for example, approximately, a thin rectangular parallelepiped shape. This rectangular parallelepiped may be, in plan view, a square (the illustrated example) or a rectangle (a square is excluded. The same or similar principle applies hereinafter). Note that an embodiment may be described based on a square for convenience without any specific note.

The main body 3 (or the capacitor 1) has any specific dimensions. In an example of the dimensions of the relatively small capacitor 1, lengths of the main body 3 (or the capacitor 1) in the D1 direction and the D2 direction may each be not less than 0.030 mm and not more than 0.200 mm. When the length in the D1 direction is L, and the length in the D2 direction is W, L/W may be not less than 0.5 and not more than 2.0. A thickness in the D3 direction may be not less than 0.030 mm and not more than 0.200 mm. Note that, when a surface of the main body 3 is not planar, for example, in various dimensions, a maximum value may satisfy the above-described range (hereinafter, the same or similar principle applies to various dimensions of the other constituent elements unless a contradiction arises).

Note that, in an example of the dimensions of each constituent element described later, the relatively small capacitor 1 will be given even without any specific note. Thus, a dimension greater (or smaller) than the illustrated dimension may be adopted.

Multiple constituent elements of the same kind (for example, 5, 7, 9, 13, 15, 16, 17, 19, or 20) may be provided with the same (or corresponding) shape, size, material, position, and the like basically (for example, except for a relatively small difference. The same or similar principle applies hereinafter) unless otherwise specified and unless a contradiction arises. Thus, the description of one constituent element may be regarded as being common to the multiple constituent elements of the same kind unless otherwise specified and unless a contradiction arises.

One layer-shaped (film-shaped) constituent element (for example, 5, 7, 9, 15, 17, or 19) may be made of one kind of material as a whole. However, layers made of mutually different materials may be stacked.

1.2. Effective Portion

The shape of the effective portion 11 illustrated in FIG. 3 is, for example, approximately, a thin rectangular parallel-epiped shape. The planar shape of the effective portion 11 is basically the same as the planar shape of the main body 3. The effective portion 11 has any specific thickness. For example, relative to the thickness of the main body 3, the thickness of the effective portion 11 may be not less than 30%, not less than 40%, or not less than 50% and may be not more than 90%, not more than 80%, or not more than 70%. Among the above-described upper and lower limits, any limits may be combined. Note that the thickness of the main body 3 is, for example, a thickness from an upper surface of the underlying electrode 16 on the side of an upper surface of the main body 3 to a lower surface of the underlying electrode 16 on the side of a lower surface of the main body 3. The thickness of the effective portion 11 is, for example, a thickness from an upper surface of the uppermost-layer inner electrode 9 to a lower surface of the lowermost-layer inner electrode 9.

The dielectric layer 7 has a layer shape basically with a constant thickness (at least between the inner electrodes 9). The thickness of the dielectric layer 7 may be appropriately set according to characteristics and the like required for the capacitor 1. In an example of a relatively small thickness, a thickness between the inner electrodes 9 adjacent to each other (between the first inner electrode 9A and the second inner electrode 9B) may be not less than 0.1 μm or not less than 0.5 μm and may be not more than 3.0 μm, not more than 2.0 μm, or not more than 1.0 μm. Among the above-described upper and lower limits, any limits may be combined. The shape and dimensions of the dielectric layer 7 in plan view are basically the same as the shape and dimensions of the effective portion 11 in plan view. The material of the dielectric layer is, for example, a ceramic, and any specific kind thereof is also possible. The number of the stacked dielectric layers 7 (the inner electrodes 9) is any number. In one example, the number is not less than 10 layers and not more than 30 layers.

The inner electrode 9 has a layer shape with a constant thickness. The inner electrode 9 has any thickness, and the thickness may be, for example, smaller than, equivalent to, or greater than the thickness of a region, in the dielectric layer 7, between the inner electrodes 9. In an example of a relatively small thickness, the thickness of the inner electrode 9 may be not less than 0.3 μm or not less than 0.5 μm and may be not more than 3.0 μm, not more than 2.0 μm, or not more than 1.0 μm. Among the above-described upper and lower limits, any limits may be combined. The material of the inner electrode 9 is, for example, a metal. Any specific kind of metal is possible, and, for example, the entirety or the main component (for example, a component of not less than 60 mass %. The same or similar principle applies hereinafter) of the metal is a base metal (for example, Ni and/or Cu).

Figure 2:
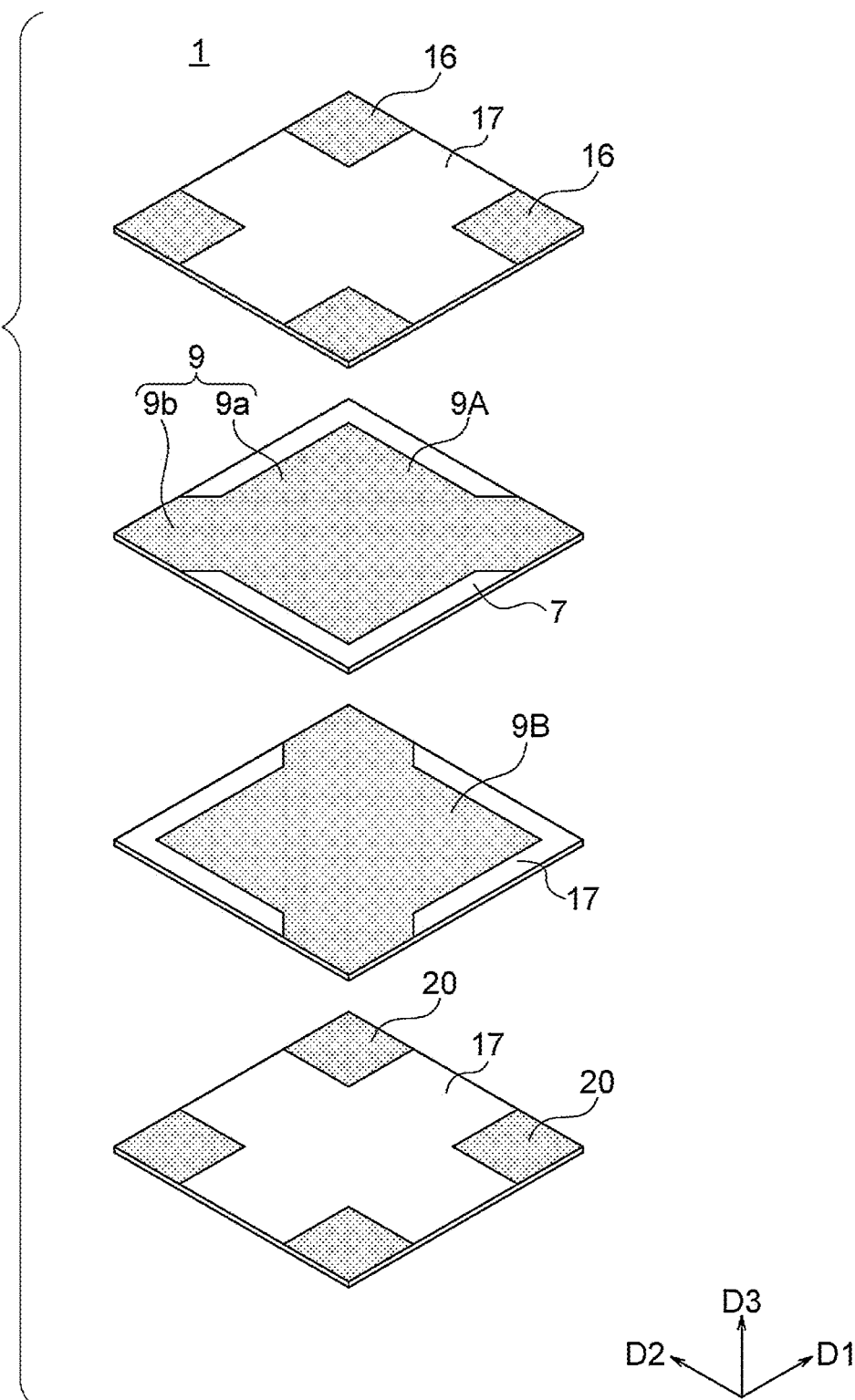
FIG. 2 is a schematic exploded perspective view of the capacitor of FIG. 1.

FIG. 2 is an exploded perspective view of the capacitor 1. FIG. 2 is a schematic view for understanding the shapes and relative position of the inner electrodes 9 and the like. Thus, in FIG. 2, various layers are illustrated with fewer layers than those in FIG. 3.

The inner electrode 9 includes, for example, in plan view, an electrode main body 9a in a quadrangular shape (a square shape in the illustrated example) and a pair of extended electrodes 9b. The extended electrodes 9b are extended from respective mutually facing corner portions, in a pair, of the electrode main body 9a. The inner electrode 9 is positioned on the inner side relative to an outer edge of the dielectric layer 7 and is not exposed from a side surface of the effective portion 11. The paired extended electrodes 9b reach the outer edge of the dielectric layer 7 and are connected to the respective outer electrodes 5, in a pair, that are positioned at mutually facing corner portions, in a pair, of the main body 3.

The first inner electrode 9A and the second inner electrode 9B face each other across the dielectric layer 7. The pair of extended electrodes 9b of the first inner electrode 9A and the pair of extended electrodes 9b of the second inner electrode 9B are positioned on mutually different diagonal lines in plane perspective. Both pairs are connected to mutually different pairs of the outer electrodes 5.

The various dimensions of the electrode main body 9a and the extended electrode 9b are any dimensions. For example, a length of the extended electrode 9b on a side of the dielectric layer 7 is approximately the same as the length of the outer electrode 5 along the side of the dielectric layer 7.

1.3. Cover

The cover 13 illustrated in FIG. 3 is formed in, for example, a layer shape with a shape and dimensions with which the cover 13 approximately overlaps the effective portion 11 without any excess or deficiency. The thickness of the cover 13 is approximately constant in each of a disposition region and a non-disposition region of the underlying electrode 16. The proportion of the thicknesses of the covers 13 to the thickness of the main body 3 may be approximately in an inverse relationship with the proportion (described above) of the thickness of the effective portion 11 to the thickness of the main body 3. For example, in an aspect where the covers 13 are provided on both sides in the D3 direction, relative to the thickness of the main body 3, for example, the thickness of one cover 13 may be not less than 5%, not less than 10%, or not less than 15% and may be not more than 35%, not more than 30%, or not more than 258. Among the above-described upper and lower limits, any limits may be combined. The thickness of the cover 13 is, for example, a thickness thereof in a region where the cover 13 overlaps the inner electrode 9 and does not overlap the underlying electrode 16 (the cover 13 is not compressed by the underlying electrode 16).

The insulating layers 17 and the dummy layer 19 overlap alternately one by one. In other words, the dummy layer 19 is provided at every boundary of all the insulating layers 17. Unlike the illustrated example, the dummy layer 19 may be provided at only some of the multiple boundaries. For example, no dummy layer 19 may be provided at not less than one boundary relatively close to the effective portion 11, and the dummy layer 19 may be provided at not less than one other boundary relatively away from the effective portion 11. However, in such a case, not less than two insulating layers 17 in close contact with each other without the dummy layer 19 interposed therebetween may be regarded as one insulating layer 17.

The insulating layer 17 has a layer shape approximately with a constant thickness except for a change in thickness due to a difference between with and without overlap relative to the conductor layers (9, 15, and 19). The planar shape of the insulating layer 17 is, for example, basically the same as the planar shape of the dielectric layer 7. The material of the insulating layer 17 is any material. For example, the material of the insulating layer 17 may be the same as or may differ from the material of the dielectric layer 7. The material of the insulating layer 17 may be, for example, a ceramic or materials other than a ceramic.

The insulating layer 17 has any thickness. For example, the thickness of the insulating layer 17 may be greater than (the illustrated example), equivalent to, or smaller than the thickness of the dielectric layer 7 (the thicknesses of both each refer to a thickness between the conductor layers or each refer to a thickness of a region not overlapping the conductor layer. In the present paragraph, the same or similar principle applies hereinafter). For example, relative to the thickness of the dielectric layer 7, the thickness of the insulating layer 17 may be not less than 2 times, not less than 3 times, or not less than 5 times and may be not more than 20 times, not more than 10 times, or not more than 5 times. Among the above-described upper and lower limits, any limits may be combined. For example, the thickness of the insulating layer 17 may be not less than 1.0 μm or not less than 2.0 μm and may be not more than 10.0 μm or not more than 5.0 μm. Among the above-described upper and lower limits, any limits may be combined. Note that, regardless of its material and thickness, the insulating layer overlapping the uppermost-layer inner electrode 9 may be regarded as the insulating layer 17 rather than the dielectric layer 7. The same or similar principle applies to the insulating layer overlapping the lowermost-layer inner electrode 9.

The dummy electrode 20 has, for example, a layer shape basically with a constant thickness. The material of the dummy electrode 20 is, for example, a metal. Any specific kind of metal is possible, and, for example, the entirety or the main component of the metal is a base metal (for example, Ni and/or Cu). The material of the dummy electrode 20 may be the same as or may differ from the material of the inner electrode 9. In plan view, the position, shape, and dimensions of the dummy electrode 20 are freely chosen. In the example of FIGS. 2 and 3, the dummy electrode 20 is set with the position, shape, and dimensions with which the dummy electrode 20 approximately overlaps the outer electrode 5 without any excess or deficiency in plane perspective (however, the outer electrode 5 is slightly larger). For example, the dummy electrode 20 is exposed at a side surface of the main body 3. Such an exposed portion is adhered to the outer electrode 5.

The dummy electrode 20 has any thickness. For example, the thickness of the dummy electrode 20 may be greater than (the illustrated example), equivalent to, or smaller than the thickness of the inner electrode 9. For example, relative to the thickness of the inner electrode 9, the thickness of the dummy electrode 20 may be not less than 1 time, not less than 1.5 times, or not less than 2 times and may be not more than 10 times, not more than 5 times, or not more than 2 times. Among the above-described upper and lower limits, any limits may be combined. For example, the thickness of the dummy electrode 20 may be not less than 0.3 μm, not less than 0.5 μm, not less than 1.0 μm, or not less than 2.0 μm and may be not more than 10.0 μm, not more than 5.0 μm, not more than 3.0 μm, or not more than 2.0 μm. Among the above-described upper and lower limits, any limits may be combined. The thickness of the dummy electrode 20 may be smaller than (the illustrated example), equivalent to, or greater than the thickness of the insulating layer 17.

1.4. Underlying Electrode

The underlying electrode 16 has, for example, a layer shape basically with a constant thickness. The material of the underlying electrode 16 is, for example, a metal. Any specific kind of metal is possible, and, for example, the entirety or the main component of the metal is a base metal (for example, Ni and/or Cu). The material of the underlying electrode 16 may be the same as or may differ from the material of the inner electrode 9 and/or the material of the dummy electrode 20. In plan view, the position, shape, and dimensions of the underlying electrode 16 are freely chosen. In the example of FIGS. 2 and 3, the underlying electrode 16 is set with the position, shape, and dimensions with which the underlying electrode 16 approximately overlaps the outer electrode 5 without any excess or deficiency in plane perspective (however, the outer electrode 5 is slightly larger).

The underlying electrode 16 has any thickness. For example, the thickness of the underlying electrode 16 may be greater than (the illustrated example), equivalent to, or smaller than the thickness of the inner electrode 9 and/the thickness of the dummy electrode 20. For example, relative to the thickness of the inner electrode 9 and/or the thickness of the dummy electrode 20, the thickness of the underlying electrode 16 may be not less than 2 times, not less than 3 times, or not less than 5 times and may be not more than 20 times, not more than 10 times, or not more than 5 times. Among the above-described upper and lower limits, any limits may be combined. For example, the thickness of the underlying electrode 16 may be not less than 2.0 μm, not less than 3.0 μm, or not less than 5.0 μm and may be not more than 20.0 μm, not more than 10.0 μm, or not more than 5.0 μm. Among the above-described upper and lower limits, any limits may be combined. The thickness of the underlying electrode 16 may be smaller than, equivalent to, or greater than (the illustrated example) the thickness of the insulating layer 17.

1.5. Outer Electrode

The outer electrode 5 has, for example, a layer shape basically with a constant thickness. The material of the outer electrode 5 is, for example, a metal. Any specific kind of metal is possible, and, for example, the entirety or the main component of the metal is a base metal (for example, Ni and/or Cu). The outer electrode 5 may be formed, as needed, by stacking mutually different materials. For example, the outer electrode 5 may be formed by stacking Cu, Ni, and Sn from the underlying electrode 16 side. The material of the outer electrode 5 may be the same as or may differ from the material of the inner electrode 9, the material of the dummy electrode 20, and/or the material of the underlying electrode 16.

As FIG. 1 illustrates, for example, approximately, at each of the corner portions of the main body 3 in plan view, the outer electrode 5 covers four surfaces (an upper surface, a lower surface, and two side surfaces) of the main body 3. Thus, the connection between one outer electrode 5 and one extended electrode 9b is achieved at two side surfaces of the main body 3, and the capacitor 1 can be surface-mounted at any one of the upper surface and the lower surface. A portion of the outer electrode 5 on each surface has any shape and dimensions. The planar shape of a portion, in the outer electrode 5, positioned on the upper surface or the lower surface of the main body 3 is, for example, a quadrangular shape (a square shape in the illustrated example). Regarding the planar shape and dimensions of a portion, in the outer electrode 5, positioned on the side surface of the main body 3, for example, such a portion positioned on the side surface has a quadrangular shape with the same lateral length as the portion positioned on the upper surface or the lower surface.

The outer electrode 5 has any thickness. For example, the thickness of the outer electrode 5 may be greater than the thickness of each of the inner electrode 9, the dummy electrode 20, and the underlying electrode 16. For example, relative to the thickness of the underlying electrode 16, the thickness of the outer electrode 5 may be not less than 1.2 times, not less than 2 times, or not less than 3 times and may be not more than 10 times, not more than 5 times, or not more than 3 times. Among the above-described upper and lower limits, any limits may be combined. For example, the thickness of the outer electrode 5 may be not less than 3 μm, not less than 5 μm, or not less than 10 μm and may be not more than 30 μm, not more than 20 μm, or not more than 10 μm. Among the above-described upper and lower limits, any limits may be combined.

2. Oxidation Region

2.1. Oxidation Region of Dummy Electrode

In the oxidation region 20*x* (FIG. 4), a metal contained in the dummy electrode 20 is oxidized. That is, the oxidation region 20*x* contains a metal oxide. Any specific kind of metal oxide is possible. For example, the oxidation region 20*x* contains NiO when the entirety or the main component of the dummy electrode 20 (before oxidation) is Ni.

For example, the oxidation region 20*x* can be observed by a scanning electron microscope (SEM) and an energy dispersive X-ray spectroscopy (EDS). Specifically, when being observed by the SEM with an appropriate magnification, the oxidation region 20*x* is observed as a region (hereinafter, referred to as a different hue region) exhibiting a hue different from the hue of a region, in the dummy electrode 20, other than the oxidation region 20*x*. When the EDS confirms the existence of an element that is the main component of the dummy electrode 20 and the existence of an oxygen element in a spot where such a different hue region identified by the SEM is positioned, the different hue region can be viewed as the oxidation region 20*x* where the dummy electrode 20 is oxidized. Note that identifying the range of the different hue region by the SEM enables identification of the range of the oxidation region 20*x* and measurement of the dimensions of the range.

Examples of a method for confirming the existence of an oxygen element by the EDS include point analysis and mapping analysis. The existence of an oxygen element in the different hue region may be confirmed by confirming, through the point analysis, for example, the spectrum of the oxygen element from the spot where the different hue region is positioned. The existence of an oxygen element in the different hue region may be confirmed by confirming, through the mapping analysis, for example, that the oxygen element concentration in the spot where the different hue region is positioned is higher than the oxygen element concentration in a region in the dummy electrode 20 other than the different hue region. This is because absurdity will arise when the oxidation region 20*x* is considered to be known based on the existence of oxygen that is inevitable and with an extremely small amount in known techniques.

The above-described point analysis or mapping analysis can serve as a method for confirming the existence of an element that is the main component of the dummy electrode 20. In the present paragraph, Ni will be given as an example of the element that is the main component of the dummy electrode 20. The existence of a Ni element in the different hue region may be confirmed by confirming, through the point analysis, for example, the spectrum of the Ni element from the spot where the different hue region is positioned.

The existence of a Ni element in the different hue region may be confirmed by confirming, through the mapping analysis, for example, that the Ni element concentration in the spot where the different hue region is positioned is higher than the Ni element concentration in the insulating layer 17.

In such an above-described mapping analysis, an area for calculation of oxygen element concentration may be set appropriately. For example, in a section parallel to the D3 direction as illustrated in FIG. 4 (for example, a D1D3 section), the concentration 41 of oxygen may be calculated for each predetermined unit area. The unit area may be an appropriate area. For example, the unit area may be 0.01 μm$^2$ (or a smaller area). Note that, depending on the situation, the unit area may be set greater than the above-described area (that is, the accuracy may suffer). The shape of each unit area may be, for example, a square (such as a 0.1 μm×0.1 μm square).

For example, a JSM-6010LV manufactured by JEOL Ltd. can serve as an SEM-EDS analyzer for observation of the oxidation region 20*x*.

In a section parallel to the D3 direction as illustrated in FIG. 4 (for example, a D1D3 section), in one dummy electrode 20, the number of the oxidation regions 20*x*, aspect of distribution, area proportion (volume proportion), size, shape, and the like are freely chosen.

For example, the dummy electrode 20 may include multiple oxidation regions 20*x* (the illustrated example), the entire dummy electrode 20 may be the oxidation region 20*x*, or the dummy electrode 20 may include one oxidation region 20*x* as a partial region of the dummy electrode 20. Such multiple oxidation regions 20*x* may be distributed, for example, in the D1 direction as in the illustrated example. And/or, such multiple oxidation regions 20*x* may include, for example, a layer-shaped oxidation region 20*x* forming an upper surface of the dummy electrode 20, and a layer-shaped oxidation region 20*x* forming a lower surface of the dummy electrode 20. One oxidation region 20*x* as a partial region of the dummy electrode 20 may be, for example, a partial region in the D1 direction as in the illustrated example or a partial region forming the upper surface or the lower surface of the dummy electrode 20.

For example, in an aspect where not less than one oxidation region 20*x* is formed as a partial region of the dummy electrode 20, any proportion of the total area of the oxidation region 20*x* to the area of the dummy electrode 20 is possible. For example, the proportion may be not less than 3%, not less than 5%, not less than 78, not less than 108, not less than 50%, or not less than 80% and may be not more than 808, not more than 50%, not more than 20%, not more than 158, or not more than 108. Among the above-described upper and lower limits, any limits may be combined.

For example, when the proportion of the total area of the oxidation region 20*x* to the area of the dummy electrode 20 is not less than 3%, the adhesion between the dummy electrode 20 and the insulating layer 17 increases with increase in the volume of the oxidation region 20*x*, thereby notably reducing the entry of a plating solution. On the other hand, when the total area of the oxidation region 20*x* in the area of the dummy electrode 20 excessively increases, stress associated with increase in the volume is applied to the inside of the capacitor, thereby increasing the possibility that a crack occurs. For example, when the proportion of the total area of the oxidation region 20*x* to the area of the dummy electrode 20 is not more than 20%, the possibility of such excessive increase in the volume of the dummy electrode 20 can be reduced, thereby being able to reduce the possibility that a crack occurs.

For example, in the aspect where not less than one oxidation region 20x is formed as a partial region of the dummy electrode 20, the oxidation region 20x may be distributed in the dummy electrode 20 uniformly or nonuniformly. An example of the latter will be given. The dummy electrode 20 will be considered while being divided into a region on the −D1 side and the other region on the +D1 side with the center in the D1 direction (refer to center line CL) as the boundary. In FIG. 4, the −D1 side is the side of an end portion of the cover 13, and the +D1 side is the side of the center of the cover 13. At this point, for example, the total area of the oxidation region 20x in the region on the −D1 side may be greater than the total area of the oxidation region 20x in the region on the +D1 side. In other words, on the side of the end portion of the cover 13, the area proportion of the oxidation region 20x may be higher than that on the side of the center of the cover 13. In this case, any difference in area (or proportion) between both the sides is possible. For example, the area of the former may be not less than 1.2 times or not less than 2 times the area of the latter.

For example, in the aspect where not less than one oxidation region 20x is formed as a partial region of the dummy electrode 20, each oxidation region 20x may extend over the entire thickness of the dummy electrode 20 (the illustrated example) or may occupy only a portion of the thickness as understood from the previous description. In the latter aspect, the oxidation region 20x is not limited to a layer shape mentioned previously and may be massive. The diameter of the oxidation region 20x in the D3 direction also has any specific size. For example, the diameter of the oxidation region 20x in the D3 direction (or the maximum length in the D3 direction) may be not less than or not more than one-half of the thickness of the dummy electrode 20.

For example, in the aspect where not less than one oxidation region 20x is formed as a partial region of the dummy electrode 20, each oxidation region 20x also has any diameter in the D1 direction as understood from the previous description. For example, the diameter of the oxidation region 20x in the D1 direction (or the maximum length in the D1 direction) may be not less than or not more than one-half of the length of the dummy electrode 20 in the D1 direction. The diameter of the oxidation region 20x in the D1 direction (or the maximum length in the D1 direction) may be not less than or not more than one-half of the thickness of the dummy electrode 20.

For example, in the aspect where not less than one oxidation region 20x is formed as a partial region of the dummy electrode 20, each oxidation region 20x has any aspect ratio as understood from the previous description. For example, the diameter in the D1 direction (or the maximum length in the D1 direction) may be not less than or not more than one-half of the diameter in the D3 direction (or the maximum length in the D3 direction). The oxidation region 20x also has any shape and may have, for example, a circular shape, an oval shape, an elliptic shape (the illustrated example), or a quadrangular shape.

For example, any diameter (minimum diameter, maximum diameter, equivalent circle diameter, or the like) of the oxidation region 20x is possible as understood from the previous description. Note that such a diameter is a diameter extending through the geometrical center (centroid) of the oxidation region 20x. For example, such a minimum diameter of the oxidation region 20x may be not less than 0.5 μm, not less than 1.0 μm, or not less than 2.0 μm. Although not required, the minimum diameter may be the same as the thickness of the dummy electrode 20 and may be the diameter in the D3 direction.

One dummy electrode 20 will be focused. The dummy electrode 20 has a length in the D2 direction. Thus, countless D1D3 sections, one of which is illustrated in FIG. 4, exist in the D2 direction. When such an above-described configuration (oxygen concentration, distribution aspect, area proportion, size, shape and/or the like) according to the oxidation region 20x in a D1D3 section is established, the above-described configuration according to the oxidation region 20x is not necessarily established in all the sections. For example, the above-described configuration may be established in not less than one-third, not less than one-half, or not less than two-thirds the length of the dummy electrode 20 in the D2 direction. Of course, the above-described configuration may be established throughout the entire length of the dummy electrode 20 in the D2 direction.

Whether the configuration according to the oxidation region 20x is established in such an above-described length range may be determined based on, for example, images of D1D3 sections of a predetermined number (such as 3, 5, or 10), set at equal distances relative to the length of the dummy electrode 20 in the D2 direction. When images of multiple sections have difficulty being extracted from one capacitor 1, images of multiple sections may be extracted from multiple capacitors 1 of the same kind.

In the example of FIGS. 1 to 3, multiple dummy electrodes 20 are provided. The above-described configuration according to the oxidation region 20x is not necessarily established in all the multiple dummy electrodes 20. For example, in an aspect where one cover 13 includes multiple dummy layers 19, only a dummy layer 19 close to or away from the effective portion 11 may include the above-described configuration according to the oxidation region 20x. In each of the dummy electrodes 20, the above-described configuration according to the oxidation region 20x may be established in each of the D1 direction and the D2 direction but is not necessarily established in both the directions. Of course, the above-described configuration according to the oxidation region 20x may be established in all the dummy electrodes 20 and in all directions.

2.2. Comparison With Oxidation Region of the Other Electrodes

The presence or absence of an oxidation region in the other electrodes (the inner electrode 9, the underlying electrode 16, and the outer electrode 5) and a specific aspect when an oxidation region exists are freely chosen. The above description according to the oxidation region 20x (concentration threshold, distribution aspect, area proportion, size, shape, and the like) may be applied to the other electrodes unless a contradiction arises.

For example, in the same section, the area proportion of the oxidation region 20x in the dummy electrode 20 may be greater than, equivalent to, or smaller than the area proportion of the oxidation region in each of the other electrodes. An example will be given below.

Note that, as in the configuration according to the oxidation region 20x, the example given below is not necessarily established in all the dummy electrodes 20 (or the other electrodes) and is not necessarily established in all the countless D1D3 sections existing in the D2 direction. In this regard, the above description according to the oxidation region 20x may also be applied.

A region, in the inner electrode 9, where a metal is oxidized is an oxidation region 9x. The proportion of the total area of all oxidation regions 20x to the area of the dummy electrode 20 (hereinafter, referred to as a "first proportion") may be greater than the proportion of the total area of all oxidation regions 9x to the area of the inner electrode 9 (hereinafter, referred to as a "second proportion"). In such a case, the inner electrode 9 may include or does not necessarily include the oxidation region 9x. When the oxidation region 9x exists, any degree of difference between the first proportion and the second proportion is possible. For example, the first proportion may be not less than 1.2 times or not less than two times the second proportion.

The above description of the comparison between the dummy electrode 20 and the inner electrode 9 may be applied to the underlying electrode 16 by replacing the term "inner electrode 9" with the term "underlying electrode 16". FIG. 4 illustrates an aspect where the underlying electrode 16 does not include an oxidation region.

The above description of the comparison between the dummy electrode 20 and the inner electrode 9 may be applied to the outer electrode 5 by replacing the term "inner electrode 9" with the term "outer electrode 5". FIG. 4 illustrates an aspect where the outer electrode 5 does not include an oxidation region. When the outer electrode 5 includes multiple metal layers, the above description of the comparison between the dummy electrode 20 and the inner electrode 9 may be applied to some layers of the multiple metal layers.

3. Manufacturing Method of Capacitor

The capacitor 1 may be manufactured by various manufacturing methods. For example, the outline procedure of the manufacturing method may be the same as and/or similar to a known procedure. An example will be given below.

First, ceramic green sheets to be the dielectric layer 7 and the insulating layer 17 are fabricated. A conductive paste to be the inner electrode 9, the dummy electrode 20, or the underlying electrode 16 is then coated on (for example, printed on) a corresponding ceramic green sheet. Then, the ceramic green sheets are stacked into a multilayer body that is to be the main body 3. Note that stacking for a multilayer body to be the effective portion 11 and stacking for a part to be the cover 13 provided for the multilayer body of the effective portion 11 may be performed together or separately.

Until the above-described fabrication of the multilayer body, for example, the process proceeds using a size of a motherboard from which a large number of main bodies 3 are obtained. After fabricating such a multilayer body, the multilayer-body-including motherboard is divided (for example, is cut) into pieces with the approximate size of the main body 3. Then, each multilayer body with the size of the main body 3 is fired. Subsequently, a metal film is formed on the main body 3, and the outer electrode 5 is thus formed.

Degreasing may be performed before the firing. The firing may be performed, for example, in a reduction atmosphere. A reoxidation heat treatment may be performed after the firing. The main body 3 may be polished (for example, barrel-polished) before and/or after the firing. In such polishing, for example, a ridge portion of the main body 3 may be chamfered, and/or a side surface of the main body 3 may be polished.

The outer electrode 5 may be formed by various methods. For example, a metal may be deposited on a surface of the underlying electrode 16 and on outside-exposed edge portions of the inner electrode 9 and the dummy electrode 20 by electroless plating and/or electroplating. A thin film forming method such as a dipping method, a printing method, a chemical vapor deposition (CVD), or a physical vapor deposition (PVD) may be adopted. Note that the underlying electrode 16 and the dummy electrode 20 may contribute to or does not necessarily contribute to the deposition of a metal as understood from the above description.

Any forming method of the oxidation region 20x (and the other oxidation regions) and any adjustment method of area proportion and the like are possible. For example, the degree of oxidation in the inner electrode 9 and the dummy electrode 20 may be adjusted by adjusting the amount of oxygen contained in the conductive paste before the coating and/or adjusting the time during which the conductive-paste-coated ceramic green sheets before the stacking are exposed in an oxidation atmosphere. For example, an oxidant or a reductant may be used at the appropriate time. By making the entirety or a portion of the dummy electrode 20 into a certain thickness or more, exposure of the dummy electrode 20 to oxygen is facilitated during or after the firing. Due to this, the degree of oxidation may be made great absolutely or may be made greater than that of the inner electrode 9. The same or similar principle may apply to the underlying electrode 16. Since the underlying electrode 16 is exposed outside before the formation of the outer electrode 5, the underlying electrode 16 may be adjusted in the degree of oxidation by an oxygen atmosphere, an oxidant, or a reductant after the firing.

4. Configuration of Capacitor According to Another Embodiment

Figure 5:
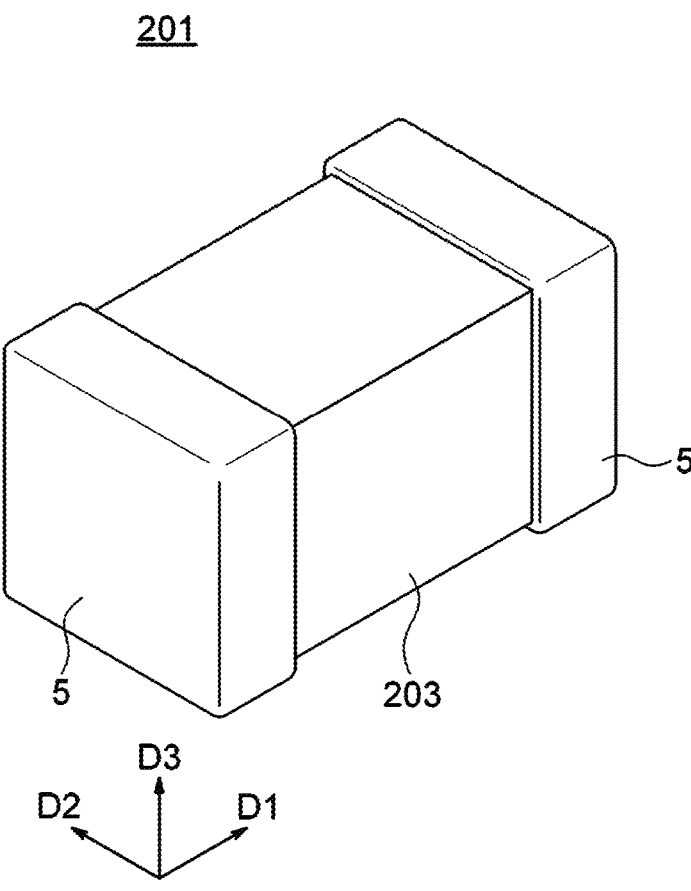
FIG. 5 is a perspective view of a capacitor according to a second embodiment.

FIG. 5 is a perspective view of a capacitor 201 according to a second embodiment. FIGS. 3 and 4 according to the first embodiment may be referred to as sectional views of the capacitor 201.

On the whole, the capacitor 201 is of two-terminal type and differs from the capacitor 1 of four-terminal type in this regard. In such a capacitor 201, an oxidation region 20x may also be formed in a dummy electrode 20 as described with reference to FIGS. 3 and 4.

The specific shape and dimensions of each portion of the capacitor 201 may differ from those of the capacitor 1 according to being the two-terminal type. The specifics are as follows.

The shape of a main body 203 (or the capacitor 201) is, for example, an approximately rectangular parallelepiped shape. In this rectangular parallelepiped, for example, a height (length in the D3 direction) may be equivalent to (the illustrated example) or smaller than a width (length in the D2 direction). The length (the D1 direction) of the rectangular parallelepiped is, for example, greater than the width. The main body 203 have any dimensions. The specific example of the dimensions of the main body 3 of the first embodiment may be applied to the dimensions of the main body 203 as long as the length in the D1 direction is greater than the length in the D2 direction. An outer electrode 5 has approximately a layer shape covering an end portion, in a longitudinal direction, of the main body 203 while extending onto five surfaces of the rectangular parallelepiped.

The planar shape of an inner electrode 9 is, for example, approximately a rectangle having four sides parallel to respective four sides of a rectangle of the main body 203 (a dielectric layer 7). In the four sides of the inner electrode 9, two long sides and one short side are positioned (not exposed) on the inner side relative to side surfaces of the main body 203, for example. The remaining one short side is exposed from a side surface of the main body 203 on the +D1 side or on the −D1 side. In the inner electrode 9, a region overlapping another inner electrode 9 in plane perspective is an electrode main body 9a. A portion extending from the electrode main body 9a to the outer electrode 5 is an extended electrode 9b.

Each dummy layer 19 includes, for example, two dummy electrodes 20 at both ends in the longitudinal direction of the main body 203. The planar shape of the dummy electrode 20 is, for example, a quadrangular shape extending over the entire width (length in the D2 direction) of the main body 203, and, for example, the dummy electrode 20 is exposed from a side surface on the +D1 side or on the –D1 side of the main body 203 and is also exposed from a side surface on the +D2 side and a side surface on the –D2 side. The above description of the configuration of the dummy layer 19 (the dummy electrode 20) in plan view may be applied to the configuration of an underlying layer 15 (an underlying electrode 16) in plan view.

Although not specifically illustrated, other examples of the configuration of the capacitor will be further given. The capacitor may include an exterior resin covering the entire structure illustrated in FIG. 1 or FIG. 5, and a lead wire connected to the outer electrode 5 and extending from the exterior resin. From another perspective, the capacitor is not of a surface mount type but may be of a through hole mount type. In such an aspect, one outer electrode 5 may cover only one side surface.

Two kinds of inner electrodes 9 connected to the respective mutually different outer electrodes 5 may be stacked alternately, not one by one, but two by two. In this case, for example, the thickness of the dielectric layer 7, between the inner electrodes 9 connected to the same outer electrode 5 and facing each other, may be smaller than the thickness of the dielectric layer 7, between the inner electrodes 9 connected to the respective mutually different outer electrodes 5 and facing each other. Such multiple dielectric layers 7 do not necessarily have the same shape and size as understood from the description here.

The two kinds of inner electrodes 9 connected to the respective mutually different outer electrodes 5 do not necessarily face each other. For example, a circuit with two parallel plate capacitors connected in series may be configured by providing, in the same layer, two kinds of inner electrodes 9 connected to the respective mutually different outer electrodes 5 and by providing an inner electrode 9 facing each of the two kinds of inner electrodes 9. A circuit with not less than three parallel plate capacitors connected in series may also be configured.

In the example of FIG. 5, in edge portions of the inner electrode 9, for example, portions (in the present paragraph, each referred to as a "non-exposed edge portion") other than a portion on the –D1 side or on the +D1 side are not exposed from side surfaces of the main body 203. Portions, in the dielectric layer 7 and an insulating layer 17, extending to the outer side relative to the non-exposed edge portions cover the respective non-exposed edge portions. However, the non-exposed edge portion may be covered, without being exposed, by causing another dielectric layer to overlap a side surface of a multilayer body that is composed of the dielectric layers 7 and the insulating layers 17. From another perspective, the entire main body 203 is not necessarily a multilayer structure.

5. Summary of Embodiments

In the following description, the reference signs of the first embodiment are used for convenience. However, the particulars described below also apply to another embodiment unless a contradiction arises.

The multilayer electronic component (capacitor 1) includes the effective portion 11 and the cover 13. The effective portion 11 incudes the dielectric layer 7 and the inner electrode 9 that are stacked alternately in the stacking direction (the D3 direction). The cover 13 overlaps the effective portion 11 in the D3 direction. The cover 13 incudes the multiple insulating layers 17 stacked in the D3 direction and the dummy electrode 20 positioned between the multiple insulating layers 17. The dummy electrode 20 includes at least one oxidation region 20x.

Thus, for example, as described in the outline of embodiment, for example, the volume of the dummy electrode 20 increases, gap formation between the dummy electrode 20 and the insulating layer 17 is reduced, and various effects are exhibited accordingly.

The thickness of the dummy electrode 20 may be greater than the thickness of the inner electrode 9.

In this case, for example, the dummy electrode 20 has a relatively large amount of contraction caused by the firing, and a gap is more likely to form. Since the oxidation region 20x is formed in such a dummy electrode 20 and reduces gap formation, the effect exhibited by the oxidation region 20x is useful. Although the contraction caused by the firing has been described, the same or similar principle also applies to the contraction according to temperature change after fabrication and/or when in use.

In a section parallel to the stacking direction (the D3 direction), the proportion (the first proportion) of the total area of the oxidation region 20x in the dummy electrode 20 to the area of the dummy electrode 20 may be greater than the proportion (the second proportion. Zero may be possible) of the total area of the oxidation region 9x in the inner electrode 9 to the area of the inner electrode 9.

Here, when the degree of oxidation of the inner electrode 9 increases, for example, electric resistivity increases, and the electrical characteristics of the capacitor 1 are degraded. On the other hand, since the dummy electrode 20 does not directly contribute to the electrical characteristics of the capacitor 1, increase in electric resistivity due to oxidation does not matter. Thus, by making the degree of oxidation of the dummy electrode 20 greater than the degree of oxidation of the inner electrode 9, the above-described gap-formation-reducing effect according to the dummy electrode 20 is easily obtained while maintaining the electrical characteristics of the capacitor 1.

In a section parallel to the stacking direction (the D3 direction), the dummy electrode 20 may include the oxidation region 20x with a minimum diameter of not less than 0.5 µm.

In this case, for example, the oxidation region 20x is relatively large, thereby enhancing the above-described effect of reducing gap formation. In particular, in the capacitor 1 with small size, the thickness of the inner electrode 9 may be 1 µm or less than 1 µm, and the dummy electrode 20 may also be made relatively thin. In such a configuration, the oxidation region 20x with a diameter of not less than 0.5 µm functions effectively.

In a section parallel to the stacking direction (the D3 direction), the dummy electrode 20 may include the oxidation region 20x large enough to extend over the entire thickness of the dummy electrode 20.

In this case, the volume of at least a portion of the dummy electrode 20 in the D1 direction (or the D2 direction) increases to the maximum in the thickness direction (however, the effect of the concentration of oxygen in the oxidation region 20x is excluded). Thus, the previously described effect of reducing gap formation is enhanced.

In a section parallel to the stacking direction (the D3 direction) and a first direction (for example, the D1 direction) orthogonal to the D3 direction, the dummy electrode 20 may be positioned, relative to the cover 13, closer to an end portion than to the center in the D1 direction (the dummy electrode 20 illustrated in FIG. 4 is on the −D1 side). In the dummy electrode 20, the total area of the oxidation region 20x in a half on the end portion side of the cover 13 may be greater than the total area of the oxidation region 20x in the other half on the center side of the cover 13.

In this case, for example, gap formation is reduced more towards the end portion of the cover 13. As a result, for example, unintended entry of a gas and/or a liquid is more likely to be hindered on the end portion side of the cover 13. Thus, for the degree of oxidation in the entire dummy electrode 20, entry of a gas and/or a liquid into a deep portion can be reduced efficiently. For example, the electrical characteristics of the capacitor 1 are more likely to be maintained.

The capacitor 1 may further include the underlying electrode 16 overlapping the cover 13 from the side opposite from the effective portion 11. In a section parallel to the stacking direction (the D3 direction), the proportion of the total area of the oxidation region 20x in the dummy electrode 20 to the area of the dummy electrode 20 may be greater than the proportion of the total area of the oxidation region (not illustrated) in the underlying electrode 16 to the area of the underlying electrode 16.

Here, when the degree of oxidation of the underlying electrode 16 increases, for example, the adhesion force of the outer electrode 5 to the underlying electrode 16 decreases. On the other hand, although the dummy electrode 20 contributes to improvement in the adhesion force of the outer electrode 5, the effect of the dummy electrode 20 on peeling of the outer electrode 5 is smaller than that of the underlying electrode 16. Thus, by making the degree of oxidation of the dummy electrode 20 greater than the degree of oxidation of the underlying electrode 16, the above-described gap-formation-reducing effect according to the dummy electrode 20 is easily obtained while maintaining the peel strength of the outer electrode 5.

The underlying electrode 16 does not necessarily include an oxidation region.

In this case, for example, the gap-formation-reducing effect according to the dummy electrode 20 is enhanced while maintaining the above-described peel strength of the outer electrode 5.

As described above, in an aspect where the area proportion of the oxidation region 20x in the dummy electrode 20 is greater than the area proportion of the oxidation region in the underlying electrode 16, the dummy electrode 20 may be thinner than the underlying electrode 16.

In this case, for example, the underlying electrode 16 having relatively great adhesion force to the outer electrode 5 is relatively thick, thereby being able to efficiently improve the adhesion force of the outer electrode 5 to the capacitor 1.

The techniques according to the present disclosure may be implemented in various aspects without being limited to the above embodiments.

For example, the multilayer electronic component is not limited to a capacitor. For example, in the multilayer electronic component, in the multiple inner electrodes, some may form a capacitor, and others or the others may form an inductor or a resistor. The multilayer electronic component may form an appropriate circuit (for example, a resonance circuit) as a whole. The cover, the underlying electrode, and the outer electrode may be provided on only one of the upper surface and the lower surface of the effective portion.

What is claimed is:

1. A multilayer electronic component comprising:
an effective portion comprising a dielectric layer and an inner electrode that are stacked alternately in a stacking direction;
a cover overlapping the effective portion in the stacking direction; and
an underlying electrode overlapping the cover from a side opposite from the effective portion,
wherein the cover comprises:
multiple insulating layers stacked in the stacking direction; and
a dummy electrode positioned between the multiple insulating layers,
the dummy electrode comprises at least one oxidation region,
wherein, in a section parallel to the stacking direction and a first direction orthogonal to the stacking direction, the at least one oxidation region are a plurality of oxidation regions and comprises an oxidation region large enough to extend over an entire thickness of the dummy electrode,
wherein the dummy electrode is positioned, relative to the cover, closer to an end portion than to a center in the first direction, and
wherein, in the dummy electrode, a first total area of the at least one oxidation region in a half on a side of the end portion is greater than a third total area of the at least one oxidation region in an other half on a side of the center,
wherein, in the section parallel to the stacking direction, a proportion of a total area of the at least one oxidation region in the dummy electrode to an area of the dummy electrode is greater than a proportion of a total area of an oxidation region in the underlying electrode to an area of the underlying electrode.

2. A multilayer electronic component comprising:
an effective portion comprising a dielectric layer and an inner electrode that are stacked alternately in a stacking direction;
a cover overlapping the effective portion in the stacking direction; and
an underlying electrode overlapping the cover from a side opposite from the effective portion,
wherein, the cover comprises:
multiple insulating layers stacked in the stacking direction; and
a dummy electrode positioned between the multiple insulating layers,
wherein the dummy electrode comprises at least one oxidation region, and
wherein in a section parallel to the stacking direction, a first proportion of a total area of the at least one oxidation region in the dummy electrode to an area of the dummy electrode is greater than a proportion of a total area of an oxidation region in the underlying electrode to an area of the underlying electrode.

3. The multilayer electronic component according to claim 2, wherein the underlying electrode does not comprise an oxidation region.

4. The multilayer electronic component according to claim 2, wherein the dummy electrode is thinner than the underlying electrode.

5. The multilayer electronic component according to claim 1, wherein, in the section parallel to the stacking direction, a proportion of a total area of the at least one oxidation region in the dummy electrode to an area of the dummy electrode is greater than a proportion of a total area of an oxidation region in the inner electrode to an area of the inner electrode.

6. The multilayer electronic component according to claim 2, wherein, in the section parallel to the stacking direction, the first proportion is greater than a proportion of a total area of an oxidation region in the inner electrode to an area of the inner electrode.

7. The multilayer electronic component according to claim 2, wherein, in the section parallel to the stacking direction, the at least one oxidation region are a plurality of oxidation regions, and the first proportion is a proportion of the total area of the plurality of oxidation regions in the dummy electrode to the area of the dummy electrode.

8. The multilayer electronic component according to claim 2, wherein, in the section parallel to the stacking direction and a first direction orthogonal to the stacking direction, the dummy electrode is positioned, relative to the cover, closer to an end portion than to a center in the first direction, and, in the dummy electrode, a total area of the at least one oxidation region in a half on a side of the end portion is greater than a total area of the at least one oxidation region in an other half on a side of the center.

9. The multilayer electronic component according to claim 6, wherein, in the section parallel to the stacking direction and a first direction orthogonal to the stacking direction, the dummy electrode is positioned, relative to the cover, closer to an end portion than to a center in the first direction, and, in the dummy electrode, an area proportion of the at least one oxidation region on a side of the end portion is greater than an area proportion of the at least one oxidation region on a side of the center.

10. The multilayer electronic component according to claim 1, wherein, in the section parallel to the stacking direction, the first proportion is not more than 20%.

11. The multilayer electronic component according to claim 1, wherein, in the section parallel to the stacking direction, the first proportion is not less than 5%.

12. The multilayer electronic component according to claim 1, wherein, in the section parallel to the stacking direction and a first direction orthogonal to the stacking direction, the dummy electrode is positioned, relative to the cover, closer to an end portion than to a center in the first direction, and, in the dummy electrode, a total area of the at least one oxidation region in a half on a side of the end portion is greater than a total area of the at least one oxidation region in an other half on a side of the center.

* * * * *